3,763,122
ACRYLAMIDE-STYRENE PHOSPHONIC ACID COPOLYMERS AS PAPER ADDITIVES

Gunther Elfers, Grosse Ile, Mich., assignor to BASF Wyandotte Corporation, Wyandotte, Mich.
No Drawing. Filed Mar. 7, 1972, Ser. No. 232,528
Int. Cl. C08f 15/02
U.S. Cl. 260—80.3 N                           3 Claims

ABSTRACT OF THE DISCLOSURE

Copolymers prepared from acrylamide and styrene or alkyl styrene phosphonic acid, said copolymers having a molecular weight of at least about 100,000 are useful for improving the burst strength of paper.

BACKGROUND OF THE INVENTION

(1) Field of the invention

The present invention pertains to the manufacture of paper and, in particular, to methods for increasing the burst strength of paper by the incorporation of certain copolymers of acrylamide and unsaturated phosphonic acids. In another aspect the present invention concerns novel copolymers of acrylamide and unsaturated phosphonic acid and methods of preparation therefor.

(2) Prior art

The incorporation of additives for increasing the strength of pulp and paper has long been known. Also, the use of acrylamide-based polymeric additives for increasing the strength of pulp and paper has long been known. However, the art still seeks the development of further additives, especially those that contribute to paper strength in an amount greater than those of the prior art.

SUMMARY OF THE INVENTION

The burst strength of paper is significantly increased by the incorporation of a burst strength paper additive which is a novel copolymer of acrylamide and unsaturated phosphonic acid, said copolymer having a molecular weight of at least about 100,000. Further, the present invention provides methods for preparing these novel copolymers.

For a more comprehensive discussion of the present invention, reference is made to the following detailed description and examples thereof.

DESCRIPTION OF THE PREFERRED EMBODIMENTS

In accordance with the present invention, novel copolymers derived from the reaction of acrylamide and unsaturated phosphonic acid and having a molecular weight of about at least 100,000 are useful for increasing the burst strength of paper.

The unsaturated phosphonic acid used to prepare the novel copolymer is a styrene phosphonic acid, such as α-styrene phosphonic acid, β-styrene phosphonic acid, mixtures thereof and the like or an alkyl styrene phosphonic acid wherein the alkyl group is ring attached. The alkyl group will generally contain from one to four carbon atoms, and preferably one to two carbon atoms. Representative compounds are, for example, p-methyl-β-styrene phosphonic acid, p-ethyl-β-styrene phosphonic acid and the like. Preferably, β-styrene phosphonic acid is the unsaturated phosphonic acid used to prepare the copolymer. The β-styrene phosphonic acid used herein can be either the cis- or trans-form, or mixtures thereof. Since β-styrene phosphonic acid is the preferred compound, the ensuing description will be rendered with reference thereto.

β-styrene phosphonic acid monomer is a known compound as described by Bergmann and Bondi, Berichte, v. 63, pp. 1158–1173 (1930). However, by the process described therein for the preparation thereof the yields of β-styrene phosphonic acid are quite minimal. Accordingly, the present invention also provides a process for producing β-styrene phosphonic acid in substantial yields.

Essentially, the process comprises hydrolyzing the adduct of styrene and phosphorus pentachloride to β-styrene phosphonic acid. More specifically, the process comprises (a) chlorinating phosphorus trichloride to phosphorus pentachloride, (b) reacting at a temperature ranging from about 20° C. to 90° C. for a period of from about two to eight hours the phosphorus pentachloride and styrene in an inert solvent and in a mole ratio of from about 1:1 to 3:1 to form the styrene-phosphorus pentachloride adduct, (c) slurrying the adduct with water at a temperature ranging from about 10° C. to 60° C. for a period of time ranging from about one to eight hours to hydrolyze the adduct to β-styrene phosphonic acid, and (d) cooling the slurry to precipitate out the β-styrene phosphonic acid.

The inert solvents utilized are the liquid hydrocarbons, including both aromatic and aliphatic, such as pentane, hexane, heptane, octane, benzene, toluene, xylene and the like as well as petroleum distillation cuts.

By the process defined herein yields of up to 100% of β-styrene phosphonic acid are achieved.

The copolymers contemplated by the present invention are advantageously prepared by reacting the acrylamide and unsaturated phosphonic acid monomers via a suspension polymerization process at a temperature ranging from about 60° C. to 80° C., preferably at a temperature ranging from about 65° C. to 75° C., for a period of time ranging from about 0.5 to eight hours, preferably one to two hours. The process is carried out in the presence of a heat transferring medium which is a non-solvent for the system, i.e., a solvent which is non-reactive with either the monomers or the copolymer, a dispersant and, optionally, a polymerization initiator.

The non-solvent which can be used herein can be any liquid material which is inert or non-reactive with the monomers as well as with the copolymer product. Common solvents of this nature are the hydrocarbon solvents, both aromatic and aliphatic, examples of which include hexane, heptane, octane, nonane, toluene, xylene, and the like. Other non-solvents are, for example, kerosene, dimethylsulfoxide, and the like.

Typical dispersants for preventing polymer agglomeration are, for example, alkali salts of dialkyl esters of sulfosuccinic acids which are soluble in the non-solvent used. The dispersant is conventionally deployed in an amount ranging from about ten to fifteen percent by weight, based on the weight of monomers.

The polymerization initiator contemplated by the present invention can be selected from the group consisting of azobisisobutyronitrile, dibenzoyl peroxide, dilauroyl peroxide, and the like. The preferred initiator is either azobisisobutyronitrile or dibenzoyl peroxide.

The initiator is employed in an amount ranging from about 0.0% to 0.5% by weight, based on the weight of monomers, and is preferably employed in an amount ranging from about 0.2% to 0.4% by weight, based on the weight of monomers.

The reaction is carried out within the above-defined parameters by mixing together the monomers in the solvent, the dispersant, and optionally, the polymerization initiator, and then heating up the mixture to the specified temperatures and which is maintained thereat for the specified time.

In carrying out the process, the acrylamide monomer is generally employed in an amount ranging from about 30% to 96% by weight, based on the total weight of the monomers, and preferably from about 75% to 95% by weight, based on the total weight of the monomers. Conversely, the copolymer product constitutes from about 4% to 70% by weight of unsaturated phosphonic acid, preferably from 5% to 25% by weight of phosphonic acid.

It should be noted that in preparing the copolymer it is possible to include minor amounts of particle-size growth regulators which prevent formation of large agglomerates, thus, providing small particles which make handling much easier. In particular, it is contemplated, although optional and not critical to the present invention, that minor amounts of an acrylamide-β-styrene phosphonic acid copolymer be used as a particle-size growth regulator. Generally, from about 0.5% to 5.0% by weight, preferably 2.0% to 4.0%, of the acrylamide-styrene phosphonic acid product, based on the weight of the acrylamide and unsaturated phosphonic acid product will be used.

The copolymer prepared in accordance herewith to be useful as paper additives will have a molecular weight of at least 100,000, usually from about 100,000 to 1,000,000 as determined by intrinsic viscosity measurements more fully described in the following examples. Particularly useful copolymer paper additives are those having a molecular weight ranging from about 200,000 to about 500,000.

The copolymers of the present invention, as noted, have demonstrated exceptional utility as paper additives and, in particular, as additives for increasing the burst strength of paper. They are generally incorporated into the paper during the pulping process and usually just prior to pouring the paper pulp onto the screen. Normally, from about 0.05% to 0.50% by weight of the copolymer, based on the weight of the oven dried (o.d.) pulp is employed. Preferably, from about 0.10% to 0.30% by weight of the copolymer based on the weight of the o.d. pulp is utilized.

For a more complete understanding of the present invention following are specific, non-limiting examples of the principles hereinbefore described. In the examples, all parts are by weight, absent indications to the contrary.

The following two examples illustrate the preparation of β-styrene phosphonic acid by the hydrolysis of a styrene-phosphorus pentachloride adduct.

EXAMPLE I

To a 1000 ml. four-necked flask equipped with stirring means, thermometer, reflux condenser and gas inlet tube is charged 69 parts (0.5 mole) phosphorus trichloride in a solution of 205 parts of heptane. With the flask maintained at 25° C. to 35° C., 35 parts (0.5 mole) of chlorine gas is then passed over the trichloride solution during a fifteen-minute period to form phosphorus pentachloride.

To the phosphorus pentachloride slurry is charged 26 parts (0.25 mole) of styrene, and the resulting mixture is then, with stirring, heated up to 50° C. and maintained thereat for eight hours, at which time hydrogen chloride evolution has ceased, thus evidencing completion of the styrene-phosphorus pentachloride adduct reaction.

To the adduct is then added 200 parts of water over a period of one hour and at a maximum temperature of about 35° C. After the water addition is completed the resulting mixture is then heated at about 50° C. for about eight hours to ensure complete hydrolysis. The mixture is then cooled to room temperature and 44 parts (96% theoretical) of β-styrene phosphonic acid, obtained as a white crystalline solid, is recovered.

EXAMPLE II

Example I is repeated using 520 parts (2.5 moles) of phosphorus pentachloride, 1500 ml. of heptane as inert solvent, 130 parts (1.25 moles) of styrene, and 1000 parts of water. Four hundred and fifty-nine parts (100% theoretical) of β-styrene phosphonic acid are recovered.

When this example is repeated 438 parts (95% theoretical) of β-styrene phosphonic acid is recovered.

The following three examples illustrate the preparation of acrylamide-β-styrene phosphonic acid copolymers.

EXAMPLE III

To a 500 ml. four-necked flask equipped with stirring means, reflux condenser, thermomoeter, gas inlet connected to a nitrogen gas source, and disposed atop heating means, is charged 23 parts (0.324 mole) acrylamide, 6.6 parts (0.036 mole) β-styrene phosphonic acid, 255 parts n-heptane, 20 parts of a 25% solution of bis(tridecyl)ester of sodium sulfosuccinic acid in n-heptane, 1.7 parts of an acrylamide-styrene phosphonic acid copolymer particle-size growth regulator, and 0.065 part of azobisisobutyronitrile in one ml. benzene as a polymerization initiator. The suspension is then heated, with stirring, to 70° C. under a nitrogen atmosphere and is maintained thereat for fifteen minutes. One part of water is then added to the suspension and the reaction is continued for an additional hour. The copolymer is then separated from the suspension by filtration, washed with acetone to extract any unreacted monomer, and dried under vacuum at about 50° C.

Eighteen parts of water-soluble solid particles are thus obtained. The solid particles have a phosphorus content of 2.9% (equivalent to 17.2% β-styrene phosphonic acid) and a molecular weight of 350,000 as determined by intrinsic viscosity in aqueous sodium nitrate and in accordance with the following equation:

$$n = 3.73 \times 10^{-4} \times M^{0.66}$$

wherein $n$ is the intrinsic viscosity and $M$ is the determined molecular weight.

EXAMPLE IV

Following the procedure of Example III an acrylamide-α-styrene phosphonic acid copolymer is prepared using the same ingredients and amounts except that 0.13 part of the polymerization initiator is employed and α-styrene phosphonic acid is employed as the comonomer.

Three parts of the water-soluble solid particles are obtained. The particles have a phosphorus content of 4.4% (equivalent to 26.1% α-styrene phosphonic acid) and a molecular weight of 140,000 as determined by intrinsic viscosity in aqueous sodium nitrate.

EXAMPLE V

The procedure and ingredients of Example III are again utilized to prepare a copolymer except that 3.3 parts of β-styrene phosphonic acid and 0.13 part of azobisisobutyronitrile polymerization initiator is employed. Twenty-six parts of white, water-soluble solid particles are obtained. The product has a phosphorus content of 2.4% (equivalent to 14.2% styrene phosphonic acid) and a molecular weight of 260,000 as determined by intrinsic viscosity in aqueous sodium nitrate.

The following examples illustrate the use of the present copolymers as paper additives.

EXAMPLES VI–VIII

Unbleached Kraft pulp is beaten to 520 Canadian Standard Freeness and handsheets are prepared therefrom by the following procedure:

Seven and two-tenths parts of o.d. pulp is slurried to a 0.2% consistency. Three percent by weight of alum, based on the weight of the pulp, is then added thereto. Sufficient sulfuric acid is then added to adjust the pH of the mixture to 4.5. After the desired pH is reached, 0.25% of the copolymer paper additive is admixed with the pulp and six TAPPI standard sheets are prepared and the Mullen burst strength determined.

The procedure outlined above is employed for the preparation of handsheets utilizing (a) no additive (as control), (b) 0.25% of the copolymer of Example III, (c) 0.25% of the copolymer of Example IV, and (d) 0.25% of the copolymer of Example V.

The control sheets have an average Mullen burst strength of 55. Handsheets prepared with the copolymer of Example III show an increase in burst strength of 20%. Handsheets prepared with th copolymer of Example IV show an increase in burst strength of 12%, and handsheets prepared with the copolymer of Example V show an increase in burst strength of 18%.

The embodiments of the invention in which an exclusive property or privilege is claimed are defined as follows:

1. An additive for increasing the burst strength of paper consisting essentially of an acrylamide-unsaturated phosphonic acid copolymer containing from about 4% to 70% by weight of the phosphonic acid and having a molecular weight of at least 100,000 as determined by intrinsic viscosity measurements, the unsaturated phosphonic acid being selected from the group consisting of α-styrene phosphonic acid, β-styrene phosphonic acid, mixtures thereof, and alkyl styrene phosphonic acid, said alkyl group having from 1 to 4 carbon atoms and being ring attached.

2. The additive of claim 1 wherein the unsaturated phosphonic acid is α-styrene phosphonic acid.

3. The additive of claim 1 wherein the unsaturated phosphonic acid is β-styrene phosphonic acid.

References Cited
UNITED STATES PATENTS 3,112,335  11/1963  Ronay _____ 260—461

JOSEPH L. SCHOFER, Primary Examiner

S. M. LEVIN, Assistant Examiner

U.S. Cl. X.R.

162—164; 260—957